United States Patent [19]
Mackes

[11] 3,850,116
[45] Nov. 26, 1974

[54] SLIP PALLET REINFORCED WITH FILLERS

[75] Inventor: Ronald C. Mackes, Northglenn, Colo.

[73] Assignee: BQP Industries, Inc., Denver, Colo.

[22] Filed: Sept. 17, 1973

[21] Appl. No.: 397,669

Related U.S. Application Data

[63] Continuation-in-part of Ser. No. 243,507, March 27, 1972, Pat. No. 3,776,145.

[52] U.S. Cl............................. 108/51, 214/10.5 R
[51] Int. Cl............................................. B65d 19/00
[58] Field of Search............................. 214/10.5 R; 108/51–58; 206/65 R, 60 A; 220/97 B; 217/43 A

[56] References Cited
UNITED STATES PATENTS

| | | | |
|---|---|---|---|
| 2,328,397 | 8/1943 | Neuman | 108/57 X |
| 3,610,173 | 10/1971 | McIlwraith et al. | 108/57 |
| 3,695,188 | 10/1972 | Granatstein | 108/58 |

FOREIGN PATENTS OR APPLICATIONS

| | | | |
|---|---|---|---|
| 564,184 | 10/1958 | Canada | 214/10.5 R |

*Primary Examiner*—Frank E. Werner
*Attorney, Agent, or Firm*—Van Valkenburgh, Lowe & Law

[57] ABSTRACT

A slip pallet formed as a square or rectangular sheet of a synthetic resin of selected types of polyolefin. The sheet is proportioned to fit upon a platen lift and includes tabs at each edge to be gripped when the platen is thrust underneath the sheet or the sheet is pulled upon or pushed off from the platen. The slip pallet will ordinarily carry loads of boxes formed as interlocking layers and an important feature of the invention resides in providing a sheet having a greater coefficient of friction at the upper surface whereon the boxes are placed, than at the undersurface which is contacted by the platen. The polyolefin material forming the slip pallet includes a filler material which may be either fibers and/or particles, the fibers being used to enhance the tensile strength of the pallet and the particles being used as an extender to reduce the amount of synthetic resin to be used.

12 Claims, 15 Drawing Figures

SLIP PALLET REINFORCED WITH FILLERS

Reference is made to the application filed by myself and Raymond F. Anderson, Ser. No. 243,507, which is now U.S. Pat. No. 3,776,145 for a plastic Slip Pallet. The present application is a continuation-in-part of that application to disclose and claim improvements in the structures and concepts therein set forth.

This invention relates to pallets and more particularly to improvements in plastic slip pallets for handling loads of boxes and the like.

The background for improvements in slip pallets, and particularly in plastic slip pallets, is set forth in the above noted application, Ser. No. 243,507, wherein it is pointed out that the prior art concerning slip pallets involved the use of chipboard pallets. Such a pallet is carried by a truck having a flat platen lift which slides underneath the pallet to pick up it and its box load. The problems involved in using chipboard pallets centered about the fact that they would tear apart if used more than once or twice.

As a result, there existed a need for an improved slip pallet, and the application, Ser. No. 243,507, discloses a slip pallet formed as a sheet of a selected type of thermoplastic polyolefin resin. The outstanding feature of this improved slip pallet is that its upper and lower surfaces have different frictional resistance, and the frictional resistance between the undersurface of the pallet and the surface of a platen is less than the functional resistance between the upper surface of the pallet and the surfaces of the boxes loaded upon the pallet.

The present invention comprises, further, a plastic slip pallet having the basic characteristics hereinbefore disclosed, using selected types of thermoplastic polyolefin resins but with the addition of fibrous and/or granular filler materials to enhance the desired physical characteristics of the material and to gain other advantages as hereinafter set forth.

An object of the present invention is to provide a novel and improved slip pallet which combines selected resin materials and fillers to further enhance the strength and frictional properties of the plastic sheet material.

Another object of the invention is to provide a novel and improved plastic slip pallet including a fibrous filler within the resin to increase the tensile strength of the sheet material forming the pallet to thereby permit the use of lowcost, low-strength resin materials.

Another object of the present invention is to provide a novel and improved plastic slip pallet including a granular filler material within the resin to produce a roughened gripping surface at the upper surface of the pallet to better hold boxes or other loads of material upon the pallet.

Another object of the invention is to provide a novel and improved plastic slip pallet which may be made of inexpensive reclaimed plastic materials and reinforced by fibrous fillers, and which are especially suitable for use as where a warehousing operation dictates that such pallets will be used only once. Such pallets may be referred to as single-use slip pallets.

Other objects of the invention are to provide novel and improved plastic slip pallets having fibrous and granular fillers within the material which are simple, versatile, rugged and tough and which may be manufactured at a minimum cost with conventional extruding and forming machinery.

With the foregoing and other objects in view, my present invention comprises certain constructions, combinations and arrangements of parts and elements as hereinafter described, defined in the appended claims and illustrated in preferred embodiment by the accompanying drawings in which:

Figure 10:
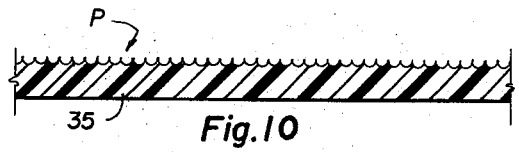
FIG. 10 is a fragmentary sectional view of the pallet as taken from the indicated line 10—10 at FIG. 9 but on a greatly enlarged and exaggerated scale to indicate in a diagrammatic manner differences in the texture between the upper and lower surfaces of the sheet.
Figure 13:
Figure 14:
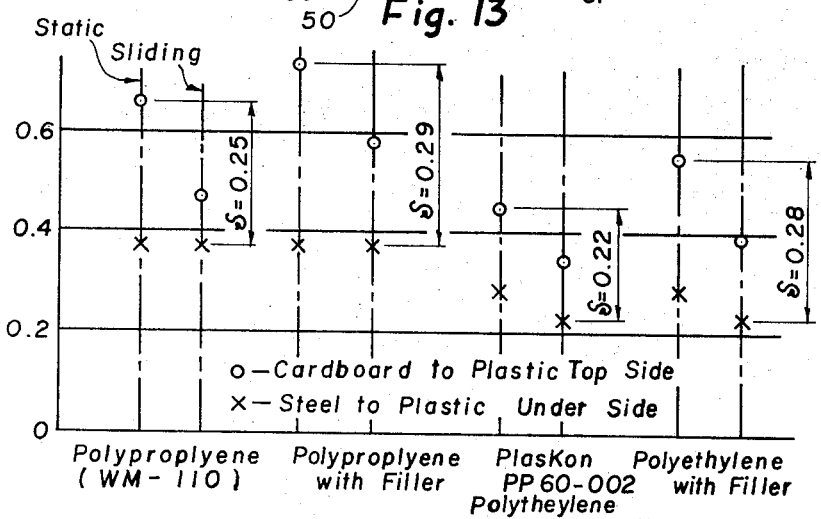

FIG. 13 is a diagrammatic, fragmentary sectional view, similar to FIG. 10, but showing a composite of fibrous and granular material as being blended into the resin making up the pallet; and FIG. 14 is a diagram indicating various frictional coefficients which are significant in considering the behavior of a loaded pallet when the platen is being thrust underneath it, including the properties obtained by the use of fillers blended into the plastic.

Figure 1:
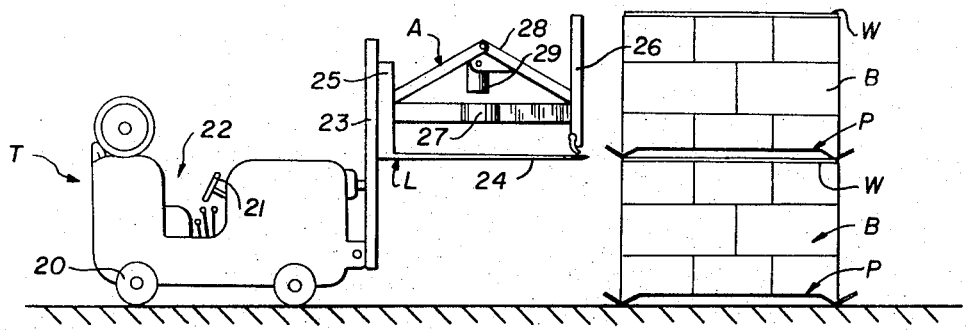
FIG. 1 is a small scale sketch showing a side elevational view of a lift truck carrying a platen and a push-pull attachment above it, and showing further, two loads of boxes stacked, one upon the other and separated by a slip pallet, the figure being exemplary of the manner in which the slip pallets are used and the type of apparatus used to handle them.
Figure 2:
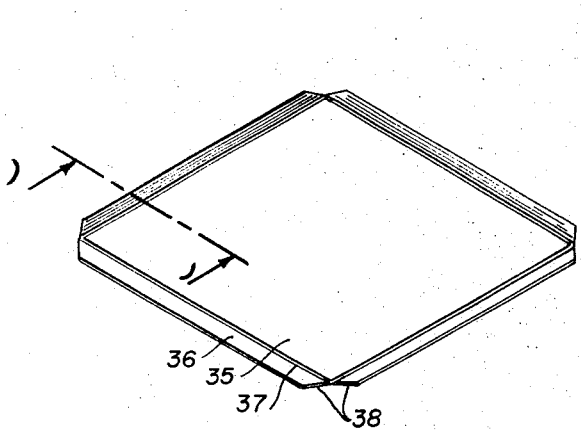
FIG. 2 is a perspective view of a slip pallet per se, constructed according to the present invention.
Figure 3:
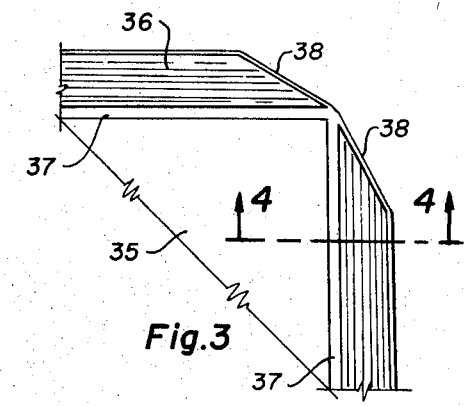
FIG. 3 is a plan view of a corner portion of the pallet shown at FIG. 2, but on an enlarged scale.

Referring more particularly to the drawing, a typical use of a slip pallet is illustrated at FIG. 1, which is exemplary of the manner in which box loads B are stacked in a warehouse upon slip pallets P. A slip pallet per se is illustrated at FIG. 2 as described in detail. First, however, the manner in which slip pallets are used and the apparatus for using them will be described to provide a better understanding of the operative problems encountered in the use of slip pallets and the need for the improvements disclosed in the present invention.

In the usual storage operation, the length and width of boxes are proportioned in such a manner as to permit a box load B which is carried upon a slip pallet P to be made up of a selected number of layers of boxes with each layer of boxes forming a rectangle or square of selected proportions which is the same size as the slip pallet P. The boxes of each layer in the load are preferably arranged in an interlocking pattern with respect to the boxes of adjacent layers to maintain the integrity of the load. In the drawing, each load of boxes B is depicted as having a square base with six boxes in each layer and being three layers high and with the boxes in the layers arranged in an interlocking pattern. To complete each box load, a plywood sheet W is placed upon the top of each box load to form a protective surface whereon a slip pallet P of the upper load will rest. Two such box loads are illustrated, with one being stacked upon the other and with each box load being carried upon a slip pallet P. Such is illustrative only and the number of layers in the box load may be considerably more than the three illustrated. Also, the number of loads forming a stack can vary and such will depend entirely upon the size and weight of the boxes, and the capacity and reach of the platen lift L.

The platen lift L, which will pick up a box load upon a slip pallet, will be carried upon a truck T of a type ordinarily referred to as a fork lift truck and indicated in a somewhat diagrammatic manner at FIG. 1. This truck T is provided with driving wheels 20, a steering wheel 21, a suitable power plant, not shown, and an operator's section 22 where controls for driving the truck and for raising and lowering and otherwise operating the platen lift L are located. The platen lift is carried upon a normally vertical guide 23 at the front of the truck. Suitable controls and mechanisms will tip this guide 23 forwardly or rearwardly from its vertical position and raise and lower the platen lift along the guide, all in a conventional, well-known manner. The platen 24 of the lift is a comparatively thin, spatula-like sheet affixed to an upright backstop 25 which, in turn, is mounted on the vertical guide 23. The width and depth of this platen 24 is selected to hold a pallet P and to accommodate a box load B such as in the stack illustrated at FIG. 1. It is contemplated that even though several types of boxes are used in a given warehouse operation, they will all be proportioned in such a manner as to form box loads which fit upon the pallets P and upon the platen lift L, all in the interest of economy of handling operations.

Figure 6:
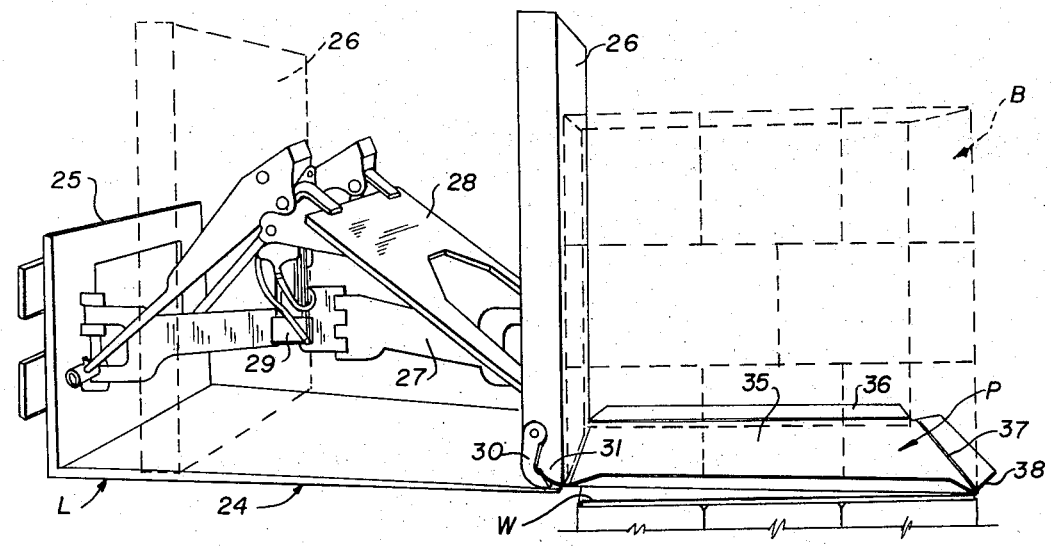
FIG. 6 is a perspective view of the platen of the lift truck with its push-pull attachment being extended to the end of the platen and gripping the tab of a slip pallet, the view depicting further, in dotted lines, the outline of a box load upon the slip pallet and, also, the retracted position of its push-pull attachment.

As illustrated at FIGS. 1 and 6, the platen lift L will include a push-pull attachment A, which is mounted upon the backstop 25 of the platen. This push-pull attachment includes a shiftable abutment 26 held in a vertical transverse position above the platen by a horizontal swing arm 27 and secured in a transverse relationship with respect to the edges of the platen by a comparatively wide upward fold arm 28 attached to the backstop 25 and to the back face of the abutment 26.

Suitable hydraulic rams 29 coact with this arm to push the abutment wall 26 forwardly and to the forward leading edge 24a of the platen, as illustrated, and to pull the abutment 26 rearwardly toward the backstop 25 as indicated in broken lines at FIG. 6. Suitable controls at the operator's section 22 regulate this push-pull movement of the abutment 26 as well as the raising and lowering and tipping of the platen 25. It is thus a simple matter for the truck operator to position the leading edge 24a of the platen 24 against the under edge of a pallet P when the truck is moved against a stack of box loads B.

An elongated gripper 30 is pivotally mounted at the back side of the abutment 26 and it is adapted to swing against the undersurface 31 of the abutment 26 to grip and hold a pallet tab as will be described. The gripper is operated by conventional hydraulic pressure members within the framework of the abutment 26 which are not shown. The undersurface 31 slopes upwardly and rearwardly from the bottom edge of the front of the abutment and the gripper 30 is formed as a hook-like member having a projecting, finger-like edge which swings into and against this surface 31 without projecting below the front bottom edge of the abutment. Thus, an upturned pallet tab can be gripped and held at the bottom of the abutment, with the bottom of the abutment being closely adjacent to the top surface of the platen 24, and with the platen thus being positioned to move underneath the slip pallet P.

The improved slip pallet P is a sheet of a selected blend of polyolefin resin as hereinafter described. This sheet is comparatively thin for its size and a practical range of thickness is from approximately 20-mils to 125-mils, and preferably, in the range of one sixteenth inch. This sheet is rectangular or square and is proportioned to hold a selected box load B and to set upon the platen 24.

The sheet forming the slip pallet P will include the rectangular or square central area 35 for the box load and one or more marginal pull tabs 36 at the edges of this central area. Pull tabs may extend from each of the four edges of the central area as illustrated, or it may extend from one, two or three of the edges. While only one pull tab 36 will be used at a time, several advantages are to be gained with a pull tab projecting from several sides of the pallet. In the first place, if one tab is accidentally torn away, the pallet is still usable. Also, with several tabs available, for example with four tabs, the pallet may be gripped and loaded onto the platen from any direction.

Figure 4:
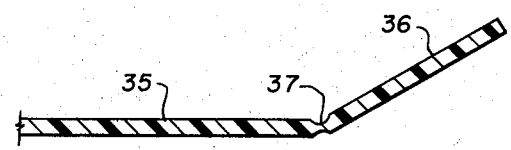
FIG. 4 is a fragmentary sectional portion as taken from the indicated line 4—4 at FIG. 3, but being exaggerated in thickness to better illustrate the construction thereof.
Figure 5:
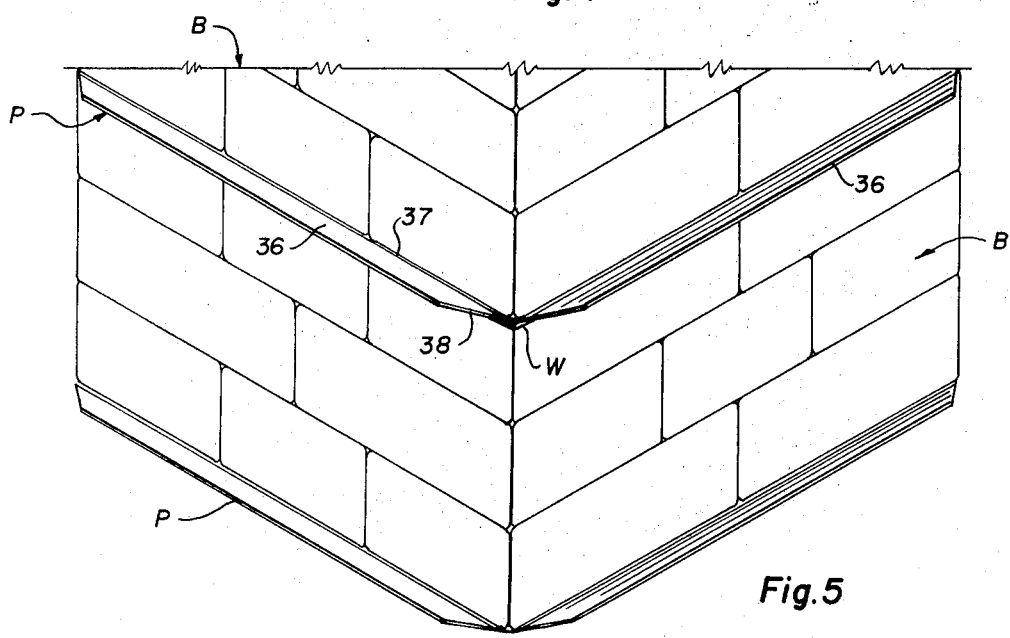
FIG. 5 is an isometric view of a portion of the stacked box loads shown at FIG. 1, showing pull tabs of the slip pallets protruding from the sides of the stack.

To facilitate the gripping of a tab 36 at the undersurface of the abutment, each pull tab is folded upwardly at an angle of about thirty degrees from the plane of the central area 35 by creases 37. Such creases may be pressure and/or heat formed in the surface of the pallet and may be formed at one, or at both sides of the pallet as illustrated at FIG. 4. To complete the pallet, each corner 38 of each tab is cut at an angle of approximately 45° with respect to the tab edge, so a tab corner will not interfere with an adjacent corner as when the tabs are folded upwardly.

Figure 7:
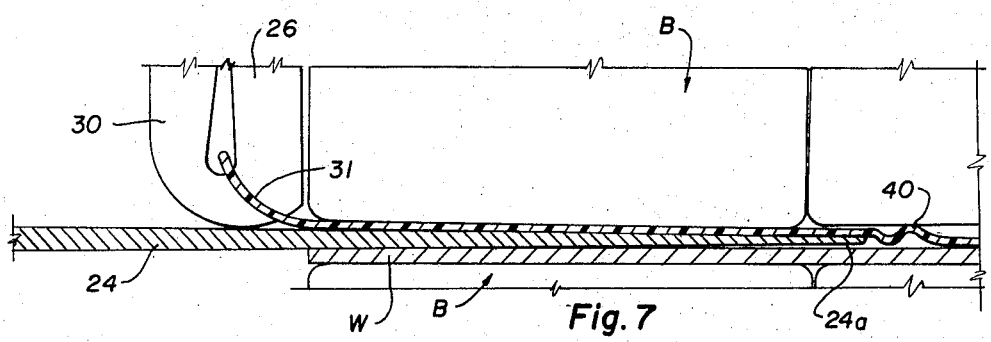
FIG. 7 is a fragmentary sectional view showing a portion of the stacked box loads with the box loads being separated by a slip pallet, with the pallet being gripped by the push-pull attachment of a platen lift, and with the lift being thrust partway underneath the slip pallet preliminary to completing the thrust and picking up the pallet and the box load upon it.
Figure 8:
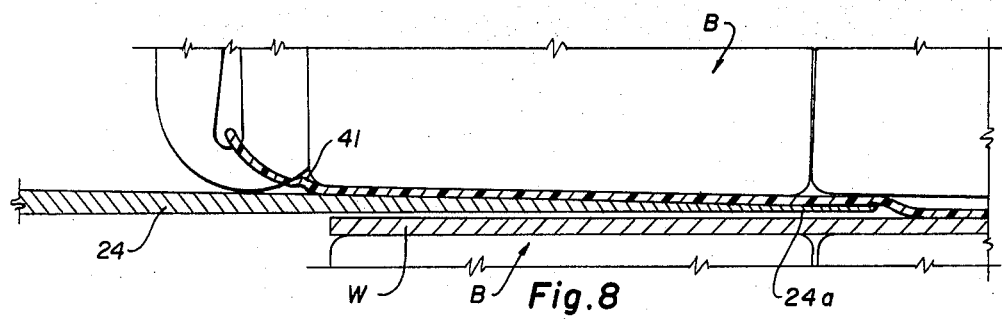
FIG. 8 is a diagrammatic view similar to FIG. 7 but illustrating the behavior of a loaded slip pallet whenever the platen is being pulled out from underneath it preliminary to removing the platen from the box load.
Figure 9:
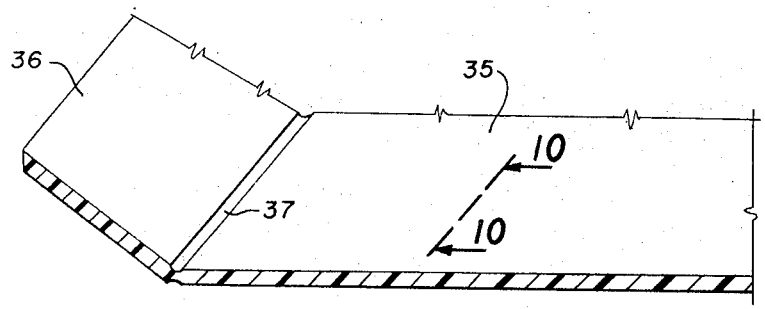
FIG. 9 is a fragmentary sectional perspective detail as taken substantially from the indicated line 9—9 at FIG. 2 but on an enlarged scale.

A better understanding of the problems arising in the use of a slip pallet, when the platen is moved underneath it, is possible by referring to FIGS. 7 and 8. In moving the platen 24 underneath a slip pallet supporting a box load, the first steps are: to adjust the elevation of the platen to the elevation of the pallet; extend the abutment 26; move the leading edge 24a of the platen and abutment against the box load; and grip and hold the projecting pallet tab 36 at the underside of the abutment. The platen 24 then commences its extension movement underneath the pallet and this thin, spatula-like platen 24 lifts the slip pallet and its load of boxes a small vertical distance, the thickness of the platen, as illustrated at FIG. 7. When the platen is completely underneath the slip pallet, the box load B may then be lifted and transported by the truck T. It is to be noted that the preferred mode of loading a slip pallet upon the platen is to move the platen itself under the box load by movement of the truck carrying the platen. At the same time, the abutment 26 moves to its retracted position with respect to the platen, but remains stationary with respect to the box load. It is also possible to pull the box load onto the platen by moving the abutment 26 to its retracted position without moving the truck. However, this latter mode of loading the platen is not recommended because a much larger pulling force is required on the tab 36 being gripped by the abutment and this force could tear the tab from the central area 35, especially if the material forming the slip pallet does not have a high tensile strength.

Regardless of whether the platen 24 is thrust underneath the slip pallet P or the slip pallet is pulled onto the platen, the force pulling the tab 36 will be substantial. This will be caused by the friction between the undersurface of the pallet and the platen when the platen moves under the pallet. A ripple 40 will form in the pallet ahead of the leading edge 24a of the moving platen. This ripple 40 will assume various forms such as that illustrated at FIG. 7 and can become quite serious if the pallet is not effectively restrained. This ripple also requires that the material forming the pallet be tough and flexible, for otherwise, the leading edge 24a of the platen would move into this ripple to tear the pallet material. The pallet material cannot be brittle; otherwise the bending action of the ripple would cause it to crack.

When the box load B and its pallet P are to be discharged from the platen, the frictional drag between the pallet and the platen is in the opposite direction to the pull hereinabove described. In discharging the box load, the abutment 26 holds the box load while the platen is retracted from underneath it. To accomplish this, the truck T carrying the platen moves away from the box load while the abutment 26 is extended over the platen to push off the box load. This creates a substantial frictional force tending to pull the pallet from underneath the box load or buckle the pallet. A buckling action 41 will occur at the edge of the tab gripped by the abutment, as shown at FIG. 8. If the buckling 41 at this edge is severe, it can damage the hinge crease 37 to cause the tab to be torn away from the pallet during a subsequent use. This buckling 41 is especially serious when using chipboard pallets.

Slip pallets manufactured from synthetic resin plastics are disclosed in the previously mentioned application, Ser. No. 243,507, now U.S. Pat. No. 3,776,145. As set forth therein, a satisfactory plastic slip pallet must have sufficient strength to withstand a pull against a tab 36 when the platen moves underneath a loaded pallet. Also, the frictional resistance between the undersurface of the pallet and the platen must be less than the frictional resistance between the upper surface of the pallet and the box load upon the pallet. With such a pallet, the platen will slide freely when it is being pushed underneath the pallet, or pulled therefrom. At the same time, a box load upon the pallet will remain essentially stationary and minimize the rippling and buckling actions, such as ripple 40 and buckling 41 heretofore described.

The prior application, Ser. No. 243,507 further discloses that the difference in frictional resistance of the upper and lower surfaces of a pallet can be effected by texturing the upper and undersurface of the pallet or by using different materials, as in a laminate. The texturing of the upper surface to create increased frictional resistance between that surface and a box load upon it can be easily obtained by using a textured sizing and cooling roll in the machinery extruding hot thermoplastic material into a web to form the pallet. In accordance with standard procedure, the texture of such roughness can be measured comparatively with mold surface standards defined in micro-inches of depth. A depth of 60 micro-inches, or more, of surface roughness has been found to be satisfactory. A slight and substantially smaller surface roughness may be provided at the undersurface and this roughness is merely sufficient to permit air to be present between the plastic and steel surfaces of the pallet and platen to prevent suction effects between these surfaces. It was found that whenever the coefficient of friction between the upper surface and a box load was at least approximately 0.15 greater than the coefficient of friction between the platen and the undersurface of the pallet, the pallets and their loads could be lifted onto a platen without trouble. Preferably, however, this difference in the coefficient of friction should be as much as 0.25 or 0.30, or even more.

Suitable materials for the improved slip pallet were found to include:

1. Polypropylene WM-110, furnished by the Shell Chemical Company of Houston, Texas.

This is a rubber-modified polypropylene, the exact components of which are proprietory information of the Shell Oil Company.

2. Profax 7823, furnished by the Hercules Powder Company of Wilmington, Delaware.

This is a copolymer of polypropylene and one or more other monomers, the exact components of which are proprietory information of the Hercules Powder Company.

3. Bestflex 401, furnished by Best Quality Plastics, Inc. of Denver, Colorado.

This is a blend of high impact polypropylene and ethylene hexene copolymer, the exact components of which are proprietory information of Best Quality Plastics, Inc.

4. PlasKon PP 60-002, furnished by the Allied Chemical Company of Morristown, New Jersey. This is a linear polyethylene.

5. PlasKon AB 50-003, furnished by the Allied Chemical Company of Morristown, New Jersey.

This is a copolymer of ethylene and one or more monomers, the exact components of which are proprietory information of Allied Chemical Company.

The preferred thickness of a slip pallet was approximately one sixteenth inch and the preferred tensile strength of the materials was in the range of 2,500–4,500 psi, as determined by ASTM specification D638-67T. Other desirable physical properties of the material include: A vicat softening point temperature in excess of 250° F. as determined by ASTM designation D1,525-65T; a brittle point temperature of at least below −20° F. as determined by ASTM specification D746-64T; and a stiffness measurement in the range of 100,000 to 150,000 psi as determined by ASTM specification D747-63. Where the pallets are to be used in low temperature environments, as in refrigerated warehouses, the selected material should have a lower brittle point temperature, such as in the range of −40° F.

The thickness of the pallet, which can vary from 20 mils to 125 mils as practical limitations must be sufficient to minimize the rippling and buckling actions 40 and 41 as the platen moves underneath and from the pallet, as hereinbefore described. It is immediately manifest that such thickness necessary to impart a degree of rigidity to the pallet will be related to the flexibility of the material forming the pallet and not necessarily to its tensile strength. The tensile strength of the material is more important in relation to pull on the tab 36 when the platen is being pushed under the pallet. Accordingly, some synthetic resin materials from which pallets may be manufactured may have a tensile strength in excess of that which is needed while others, otherwise suitable, may be deficient in tensile strength. For example, some selected types of high impact polypropylene have a greater tensile strength than that needed for pallets, while some types of a low density polyethylene may not have sufficient tensile strength for pallets handling normal loads.

The present invention contemplates a more advantageous use of selected resins either having an excess of tensile strength or also selected resin materials having a deficiency of tensile strength by adding fillers to the material. A resin deficient of tensile strength can be strengthened by the incorporation of fibers into the body of the material. A pallet material having a high tensile strength can be more efficiently used, costwise, by the incorporation of particles in the body of the material to constitute an extender. This latter expedient can be accomplished in such a manner as to favorably increase the frictional difference between the undersurface and upper surface of the pallet.

A synthetic plastic resin such as low density polyethylene is suitable for slip pallets but it has a relatively low tensile strength. Resins of this type are generally low in cost and from the economic viewpoint, they are desirable to use, especially in situations where the pallet is to be used only once and then discarded or reprocessed. Thus, this material can be used when fibers are interblended to increase its tensile strength.

Figure 11:
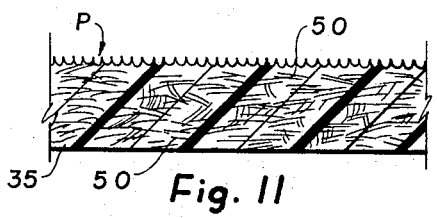
FIG. 11 is a diagrammatic, fragmentary sectional view, similar to FIG. 10, but on an enlarged scale and showing a fibrous material as being blended into the resin making up the pallet.

A synthetic resin plastic is ordinarily manufactured into a slip pallet by first blending hot plastic stock in the blending section of an extrusion apparatus and then ejecting the same from the extrusion dies to form a web. This web then moves around sizing, finishing and cooling rolls to establish its proper thickness and then trimmed to establish its length and width. In the present invention, fibrous materials may be added to and incorporated into the synthetic resin stock while in the blending section of the extruder. Also, fibers may be added to a surface of the web as the web passes through the rolls. The resulting fibers are shown in a somewhat diagrammatic manner as 50 at FIG. 11. The fibers may be asbestos, fiberglass, synthetic or organic material, such as cellulose fibers or shredded paper, provided that the fibers can withstand the heat of the molten plastic in the blender.

Figure 11A:
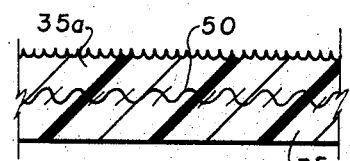
FIG. 11a is a diagrammatic, fragmentary sectional view, similar to FIG. 11, but showing the fibrous material as a woven web within the body of the resin making up the pallet.

FIG. 11a illustrates a modified arrangement of incorporating fibers into the body of the resin, where fibers 50a are in a woven mat between layers of resin 35a. The layers of resin may be laminates.

The amount of fiber which can be blended into a plastic can vary considerably and can be as much as 75 percent of the resin by weight. In an ordinary operation, it was observed that these fibers would be oriented in the web in a random manner. However, by controlling extrusion conditions, the fibers can be oriented to some degree, either transversely or longitudinally of the web. Regardless of the orientation, the fibers materially enhance the strength of the pallet especially at the hinge 37 between the body of the pallet 35 and the tab 36. An important advantage in the use of fibers 50 resides in reinforcing the hinge portion 37, since the maximum degree of stress and strain will be encountered at this hinge portion.

Figure 12:
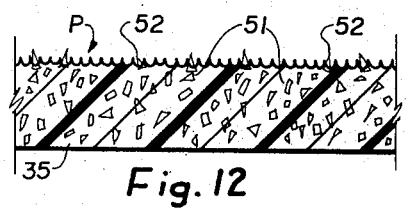
FIG. 12 is a diagrammatic, fragmentary sectional view, similar to FIG. 10, but showing granular material as being blended into the resin making up the pallet.

When a resin such as a high impact polypropylene is to be used for a pallet, it has more than an adequate tensile strength for most requirements and good economy is to reduce the amount of resin in each pallet. This cannot be done by reducing the thickness of the pallet beyond a certain extent without making the pallet too flimsy to be used. However, the material may be supplemented by a filler or extender, as particles 51, indicated at FIG. 12. These particles may be inorganic, or organic, solid or hollow. The size range may vary from micron size, for example, talc, to a diameter as great as the thickness of the pallet. Preferably, the surface characteristics of these particles should be such as to adhere to the resin. The high impact polypropylene has a tensile strength which is more than sufficient to resist the pull against the tab 36 of a pallet and the use of an extender yields a definite economy of material since it reduces the amount of resin needed. Also, it was discovered that such particles 51 can usually be used to advantage in increasing the differences between the frictional resistance between the upper and lower surfaces of the pallet. In the manufacture of a web of high impact polypropylene which is filled with and extended by particles such as ground walnut shells or sand, the particles 51 may be first blended into the resin in the blending section of the extrusion apparatus. The resin in then ejected from the extrusion dies to form a web in an ordinary manner. The web is then moved about sizing and finishing rolls as heretofore mentioned.

In the arrangement which provides for a roughened upper surface of the pallet by a textured roll as heretofore mentioned, it was discovered that the points of many particles would appear at the upper surface of the pallet, as at 52, and actually seem to protrude from this upper surface short distances to enhance the gripping properties of the upper surface. On the other hand, the roll forming the smooth undersurface of the pallet, a smooth roll, will effectively prevent the points of any particles from protruding beyond the smooth plastic undersurface. This will thus provide an increased difference in frictional resistance between the upper and undersurfaces of the pallet as indicated in the diagram at FIG. 14, a desirable property in using the pallet. FIG. 14 shows a comparison of the coefficients of friction between the top surface of a pallet and a box load and the undersurface of the pallet and a platen for high impact polypropylene (WM 110) and linear polyethylene (PlasKon PP-60-002) pallet materials as described in the aforementioned U.S. Pat. No. 3,776,145, and hence need not be described further.

Where a plastic material suitable for pallets in all respects except as to tensile strength is available, it can be formed into pallets which are reinforced by fibers 50 and which also contain filler particles 51, as shown at FIG. 13. Also, this combination is especially useful for incorporation into resins with inherently low coefficients of fraction to provide a pallet with the necessary differential in coefficient between the top and bottom surfaces. In this way, a suitable product can be manufactured at a minimum cost and the same is especially desirable where low cost, one-use pallets are needed, as, for example, where the pallets and their box loads once loaded in a freight car or truck will be shipped to distant destinations where recovery of the pallets for reuse is not feasible. It was determined that a simple pallet made of reclaimed polypropylene having approximately 25 percent cellulose fibers 50 and 25 percent particles 51 of diatomaceous earth filler would function satisfactorily for single use purposes as an effective, economical unit.

Other suitable proportions of fibers and fillers can be blended into any selected resin by a cut-and-try procedure until a satisfactory final product is obtained which will have a minimum cost for the purpose for which the pallet is to be used.

As a further expedient, a layer of particles 53, such as sand, shown at FIG. 13, may be applied to the upper surface of the web of a pallet, as the web is coming out of the extruding dies. The particles 53 may be applied in any suitable manner as by sprinkling them on the web before the web passes into the sizing rolls. In this way, the upper surface of the pallet will grip a box load in a very effective manner.

It is apparent from the foregoing that yet other combinations, arrangements and equivalent materials can be efficiently used in the manner herein disclosed and that others skilled in the art can build alternate and equivalent constructions of such slip pallets. Hence, I desire that my protection be limited not by the constructions illustrated and described, but only by the proper scope of the appended claims.

I claim:

1. A slip pallet for holding a load of cardboard boxes, or the like, and carried by a platen which slides underneath the slip pallet and its box load for loading and unloading the same onto and off from the platen, said pallet comprising:

a tough, pliable sheet of single thickness of synthetic thermoplastic resin having a thickness in the range of approximately 20 to 125 mils;

a central area whereon the box load is placed;

a tab means alongside at least one edge of this central area folded upwardly along the edge of the central area to be gripped and held whenever the platen is moving underneath the pallet from the tab side;

a modified upper surface at the central area adapted to enhance the contact thereof with the cardboard surfaces of the box load upon the pallet sufficient to increase the static frictional resistance between the box load and the pallet to a degree which exceeds the sliding frictional resistance between the pallet and the platen, and a filler blended into the resin.

2. The slip pallet defined in claim 1, wherein: the filler material consists of fibers.

3. The slip pallet defined in claim 1, wherein: the filler material is asbestos fibers.

4. The slip pallet defined in claim 1, wherein: the filler material is cellulose fibers.

5. The slip pallet defined in claim 4, wherein: the cellulose fibers are shredded paper.

6. The slip pallet defined in claim 1, wherein: the filler material consists of particles.

7. The slip pallet defined in claim 1, wherein: the filler material is ground wood products.

8. The slip pallet defined in claim 1, wherein: the filler material is inorganic particles.

9. The slip pallet defined in claim 1, wherein: the filler material consists of a mixture of fibers and particles.

10. The slip pallet defined in claim 1, wherein: the filler material includes particles adjacent to the upper surface of the pallet.

11. The slip pallet defined in claim 1, wherein: the filler material includes fibers adjacent to the upper surface of the pallet.

12. The slip pallet defined in claim 1, wherein: the filler material is a web of fibrous material within the body of the plastic.

* * * * *